(12) United States Patent
Badger, II et al.

(10) Patent No.: US 11,973,348 B2
(45) Date of Patent: Apr. 30, 2024

(54) GRID POWER DEPENDENT PRECONDITIONING OF VEHICLE

(71) Applicant: Ford Global Technologies, LLC, Dearborn, MI (US)

(72) Inventors: Charles Everett Badger, II, Westland, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 17/146,933

(22) Filed: Jan. 12, 2021

(65) Prior Publication Data

US 2022/0224119 A1    Jul. 14, 2022

(51) Int. Cl.
| | |
|---|---|
| *H02J 3/32* | (2006.01) |
| *B60H 1/00* | (2006.01) |
| *B60L 53/14* | (2019.01) |
| *B60L 58/12* | (2019.01) |

(52) U.S. Cl.
CPC .......... *H02J 3/322* (2020.01); *B60H 1/00735* (2013.01); *B60H 1/00778* (2013.01); *B60L 58/12* (2019.02); *B60L 53/14* (2019.02)

(58) Field of Classification Search
CPC .......... H02J 3/322; B60L 58/12; B60L 53/14; B60H 1/00735; B60H 1/00778
See application file for complete search history.

(56) References Cited

U.S. PATENT DOCUMENTS

| | | | |
|---|---|---|---|
| 7,542,827 B2 | 6/2009 | Gerard et al. | |
| 2010/0132388 A1* | 6/2010 | Oyobe | B60H 1/00771 62/157 |
| 2013/0234651 A1* | 9/2013 | Buford | B60L 53/63 320/107 |
| 2013/0271074 A1* | 10/2013 | Federico | B60L 15/2045 320/109 |
| 2014/0330453 A1* | 11/2014 | Nakagawa | B60L 53/63 701/2 |
| 2014/0379174 A1* | 12/2014 | Holub | B60R 16/033 701/2 |
| 2017/0008375 A1* | 1/2017 | Blatchley | H01M 10/615 |

OTHER PUBLICATIONS

Elena Opris, "Auto-Switch Power Plans to Maximize Performance or Save Battery Life", https://www.softpedia.com/blog/auto-switch-power-plans-to-maximize-performance-or-save-battery-life-505837.shtml, Mar. 20, 2020, 6 pgs.

* cited by examiner

*Primary Examiner* — James J Lee
*Assistant Examiner* — Wenyuan Yang
(74) *Attorney, Agent, or Firm* — David B. Kelley; Brooks Kushman P.C.

(57) ABSTRACT

A controller initiates operation of a climate system in advance of a departure time defined by a user such that the climate system operates for a duration defined by the user before the departure time, provided that grid power from a plug is not available to power the operation. The controller also initiates operation of the climate system at a start time selected by the controller such that a temperature within a cabin achieves a target temperature defined by the user in advance of the departure time and the climate system does not operate for a duration defined by the user before the departure time, provided that the grid power is available to power the operation.

17 Claims, 2 Drawing Sheets

GRID POWER DEPENDENT PRECONDITIONING OF VEHICLE

TECHNICAL FIELD

This disclosure relates to vehicle climate control operations.

BACKGROUND

A vehicle may operate in advance of driver use to adjust a cabin climate. A climate control system, for example, may be activated prior to vehicle start to increase or decrease a cabin's temperature toward a target. A driver may set this target.

SUMMARY

A vehicle includes a climate system and a controller. The controller initiates operation of the climate system in advance of a departure time defined by a user such that the climate system operates for a duration defined by the user before the departure time, provided that grid power from a plug is not available to power the operation. The controller also initiates operation of the climate system at a start time selected by the controller such that a temperature within a cabin achieves a target temperature defined by the user in advance of the departure time and the climate system does not operate for a duration defined by the user before the departure time, provided that the grid power is available to power the operation.

A method for controlling a climate system of a vehicle includes, responsive to power remote from the vehicle being available for use with the climate system, activating the climate system at a start time such that a temperature within a cabin achieves a target temperature in advance of a departure time and the climate system does not operate for a duration defined by a user before the departure time. The method also includes, responsive to power remote from the vehicle not being available for use with the climate system, activating the climate system in advance of the departure time such that the climate system operates for the duration defined by the user before the departure time.

A climate control system includes a controller that activates a climate system at a start time selected by the controller such that a temperature within a cabin achieves a target temperature in advance of a departure time responsive to a request for preconditioning and grid power being available to power the climate system, and activates the climate system at a start time selected by the controller such that the climate system operates for a duration defined by a user responsive to the request for preconditioning and the grid power not being available to power the climate system.

DETAILED DESCRIPTION

Figure 1:
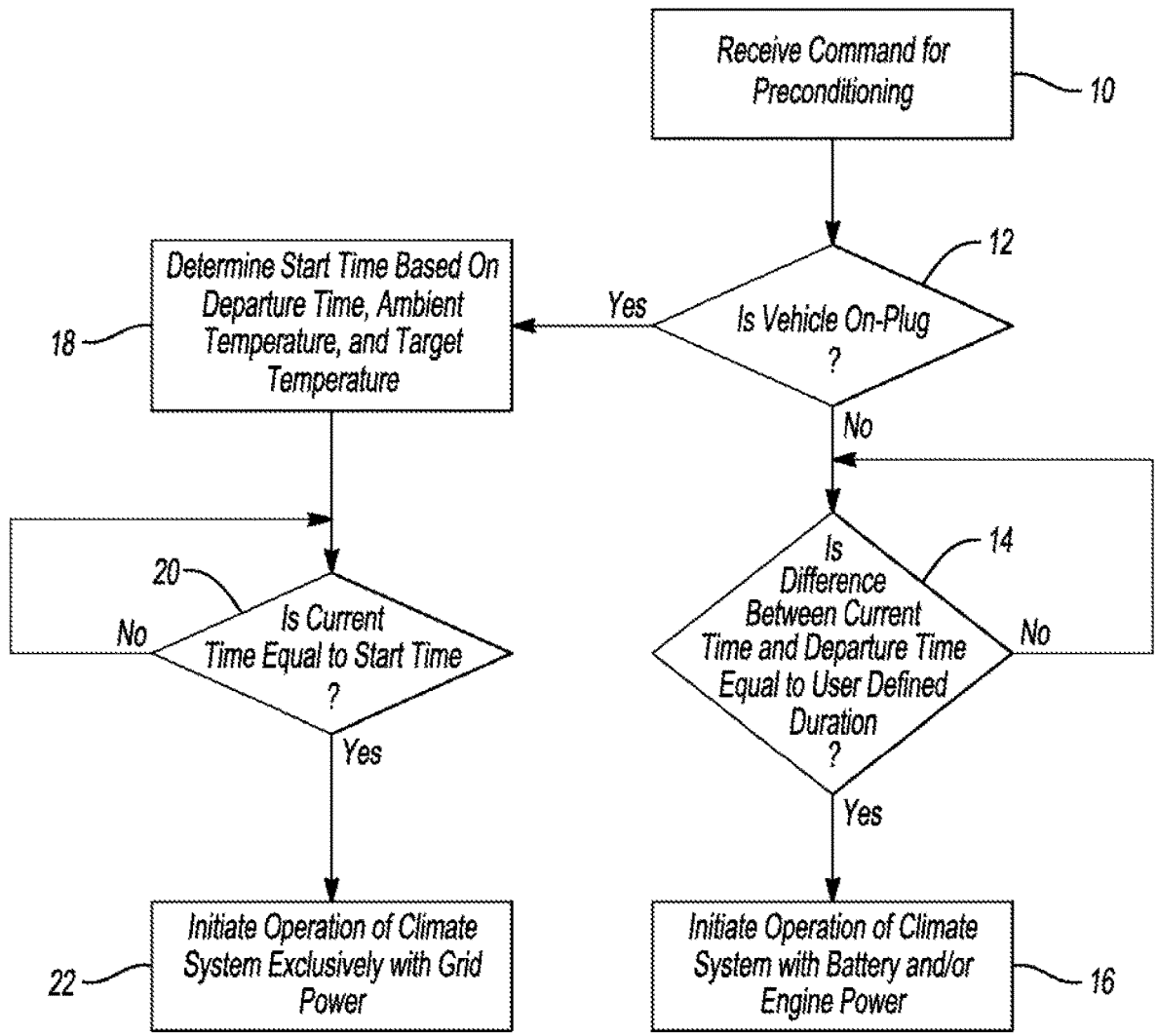
FIG. 1 is a flow chart of an algorithm for preconditioning a vehicle.

It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Scheduled remote start and/or departure time preconditioning are features that may be offered in certain vehicles. In scheduled remote start, a schedule defines a time at which the vehicle will remote start. This schedule may be stored by the vehicle or by a remote server that can communicate with the vehicle. The vehicle or remote server may thus command a start at a user predefined time (e.g., 5 minutes, 10 minutes, 15 minutes) in advance of a departure time defined by the schedule. Such a start may include activation of a climate control system that conditions the cabin and/or other components of the vehicle. Battery power, engine power, and/or grid power (if available) can be used to operate the climate control system. Use of battery power and/or engine power may deplete energy stores by the vehicle.

In departure time preconditioning, a schedule and other factors define a time at which the vehicle will start. These other factors may include ambient temperature, target temperature, etc. The vehicle or remote server may thus identify a start time as a function of a departure time, the target temperature, and ambient temperature. Using known techniques and a user defined departure time of 8:00 AM, a user defined cabin target temperature of 78° F., and a measured ambient temperature of 35° F., a vehicle controller or the remote server may determine that a climate control system would need to operate for 45 minutes at a medium setting to warm the cabin to the target temperature. The vehicle or remote server may thus command a start of the climate system at 7:15 AM-45 minutes in advance of the 8:00 AM departure time. Thus, the user in this scenario does not have control over how long the climate system will run in advance of the departure time, unlike the scheduled remote start scenario. A maximum run time limit (e.g., 1 hour), however, may preclude unusually long (and thus unnecessary) preconditioning.

Given the longer durations of climate system operation possible with departure time preconditioning, this feature is typically only offered on plug-in vehicles in which grid power may be used to operate the climate system. (Operating a climate system for 45 minutes for example on battery power or engine power alone may unacceptably deplete energy stores of the vehicle.) For plug-in vehicles that offer both scheduled remote start and departure time preconditioning, one may interfere with the other under certain circumstances. A plug-in hybrid vehicle in which a user has defined a 9:00 AM departure time and that is on plug, may begin preconditioning the cabin at 8:30 AM according to the departure time preconditioning feature using only grid power, and at 8:50 AM may override the departure time preconditioning feature and continue preconditioning the cabin according to the scheduled remote start feature using battery and/or engine power, depleting energy stores of the vehicle. To avoid this situation, strategies described herein separate use of scheduled remote start and departure time preconditioning according to whether grid power is available to power the climate system. When grid power is available, for example, only departure time preconditioning is allowed. When grid power is not available, only scheduled remote start is allowed.

Referring to FIG. 1, at operation 10 a command is received for preconditioning. This command may by input in advance by a user and include a schedule of departure times for coming days, a climate system duration of operation setting, and a selection indicating that preconditioning is desired before departure. At decision block 12, it is determined whether the vehicle is on plug. Known techniques involving contact, current, voltage, etc. sensors may be used to identify whether their output is indicative of the vehicle being plugged-in to a wall socket for example. If no, at operation 14, it is determined whether a difference between the current time and a next departure time is equal to the climate system duration of operation defined by the user. If, for example the next departure time is 7:00 AM and the user defined climate system duration of operation is 15 minutes, it can be determined whether a difference between the current time and the departure time is 15 minutes. A current time of 6:45 AM in this example would yield a difference of 15 minutes. A current time of 6:30 AM would yield a difference of 30 minutes. If no, the algorithm returns to operation 14. If yes, at operation 16 operation of a climate system is initiated with battery and/or engine power. Power from a traction battery, for example, may be used to activate an air conditioner or heater in known fashion.

Returning to operation 12, if yes, at operation 18 a start time is determined based on a next departure time, ambient temperature, and a user defined target temperature for example. Common climate control techniques may be used to determine the amount of time necessary to achieve the target temperature. This time can be subtracted from the departure time. If for example it is determined that 25 minutes are necessary for the climate system to bring the cabin temperature to the target temperature, and the departure time is 4:30 PM, the start time will be set to 4:05 PM. At decision block 20 it is determined whether the current time is equal to the start time. If no, the algorithm returns to operation 20. If yes, at operation 22 operation of the climate system is initiated exclusively with power from the grid. Power from a wall socket, for example, may be used to activate the air conditioner or heater in known fashion.

Figure 2:
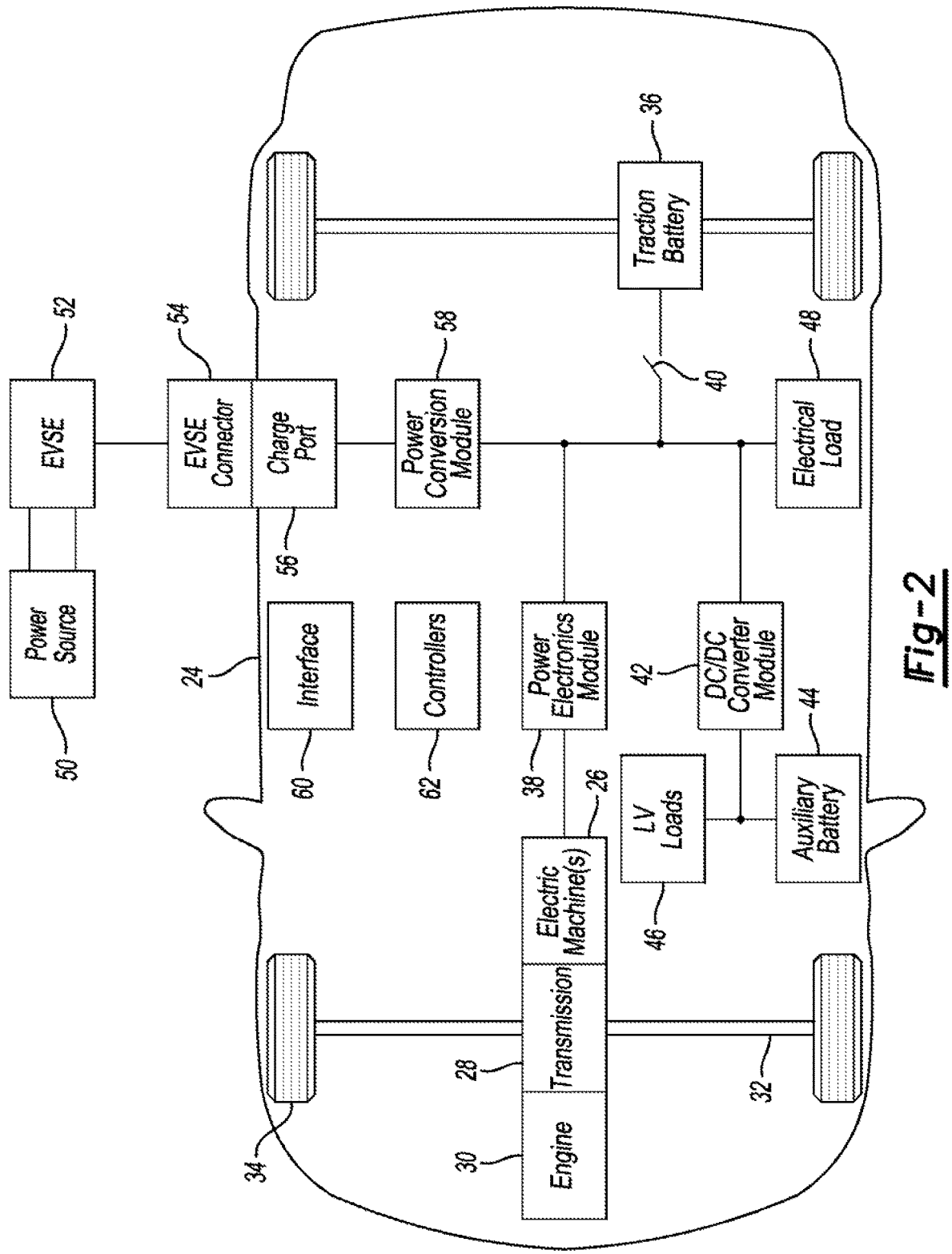
FIG. 2 is a schematic diagram of a vehicle.

Referring to FIG. 2, an electrified vehicle 24 (e.g., a plug-in hybrid-electric vehicle) includes one or more electric machines 26 mechanically coupled to a hybrid transmission 28. The electric machines 26 may operate as a motor or generator. In addition, the hybrid transmission 28 is mechanically coupled to an engine 30 and drive shaft 32. The drive shaft 32 is mechanically coupled to wheels 34. The electric machines 26 can provide propulsion and slowing capability when the engine 30 is turned on or off. The electric machines 26 may also act as generators and can provide fuel economy benefits by recovering energy that would normally be lost as heat in a friction braking system. The electric machines 26 may also reduce vehicle emissions by allowing the engine 30 to operate at more efficient speeds and allowing the electrified vehicle 24 to be operated in electric mode with the engine 30 off under certain conditions. The electrified vehicle 24 may also be a battery electric vehicle. In such a configuration, the engine 30 may not be present. Other arrangements are also contemplated.

A traction battery or battery pack 36 stores energy that can be used by the electric machines 26. The vehicle battery pack 36 may provide a high voltage direct current (DC) output. The traction battery 36 may be electrically coupled to one or more power electronics modules 38. One or more contactors 40 may isolate the traction battery 36 from other components when opened and connect the traction battery 36 to other components when closed. The power electronics module 38 is also electrically coupled to the electric machines 26 and provides the ability to bi-directionally transfer energy between the traction battery 36 and the electric machines 26. For example, the traction battery 36 may provide a DC voltage while the electric machines 26 may operate with a three-phase alternating current (AC). The power electronics module 38 may convert the DC voltage to a three-phase AC current to operate the electric machines 26. In a regenerative mode, the power electronics module 38 may convert the three-phase AC current from the electric machines 26 acting as generators to the DC voltage compatible with the traction battery 36.

In addition to providing energy for propulsion, the traction battery 36 may provide energy for other vehicle electrical systems. The electrified vehicle 24 may include a DC/DC converter module 42 that converts the high voltage DC output of the traction battery 36 to a low voltage DC supply that is compatible with low-voltage vehicle loads. An output of the DC/DC converter module 42 may be electrically coupled to an auxiliary battery 44 (e.g., 12V battery) for charging the auxiliary battery 44. Low-voltage systems 46 may be electrically coupled to the auxiliary battery 44. One or more electrical loads 48 may be coupled to the high-voltage bus. The electrical loads 48 may have an associated controller that operates and controls the electrical loads 48 when appropriate. Examples of the electrical loads 48 include a fan, electric heating element, air-conditioning compressor, and other heating, ventilating, and air conditioning components.

The engine 30 may also provide energy for other vehicle electrical systems. The engine 30 via the transmission 28 may drive the electric machines 26 to generate power for the power electronics module 38 and electrical loads 38, etc.

The electrified vehicle 24 may be configured to recharge the traction battery 36 as well as power the electrical loads 48 from an external power source 50. The external power source 50 may be a connection to an electrical outlet, an electrical power distribution network, or a grid as provided by an electric utility company. The external power source 50 may be electrically coupled to a charger or electric vehicle supply equipment (EVSE) 52. The EVSE 52 may provide circuitry and controls to regulate and manage the transfer of energy between the power source 50 and electrified vehicle 24. The external power source 50 may provide DC or AC electric power to the EVSE 52. The EVSE 52 may have a charge connector 54 for plugging into a charge port 56 of the electrified vehicle 24. The charge port 56 may be any type of port configured to transfer power from the EVSE 52 to the electrified vehicle 24. The charge port 56 may be electrically coupled to a charger or on-board power conversion module 58. The power conversion module 58 may condition the power supplied from the EVSE 52 to provide the proper voltage and current levels to the traction battery 36 and/or electrical loads 48. The power conversion module 58 may interface with the EVSE 54 to coordinate the delivery of power to the electrified vehicle 24. The EVSE connector 54 may have pins that mate with corresponding recesses of the charge port 56. Alternatively, various components described as being electrically coupled or connected may transfer power using wireless inductive coupling.

Controllers/interfaces/modules in the electrified vehicle 24 may communicate via one or more vehicle networks. The vehicle network may include a plurality of channels for communication. One channel of the vehicle network may be a serial bus such as a CAN. One of the channels of the vehicle network may include an Ethernet network defined by the Institute of Electrical and Electronics Engineers 802 family of standards. Additional channels of the vehicle network may include discrete connections between modules and may include power signals from the auxiliary battery 44. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but the vehicle network may connect to any electronic module that is present in the electrified vehicle 24 or remote from the electrified vehicle 24 via a transceiver.

The electrified vehicle 24 may thus include an interface 60 (e.g., touch screen, cellular transceiver, etc.) configured to receive user input defining desired departure times and the like, and a plurality of controllers 62 (e.g., a body controller, brake controller, central timing controller, hybrid powertrain controller, suspension controller, etc.). One or more of these controllers 62 may perform the algorithms and/or operations contemplated herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a climate system; and
   a controller programmed to
      initiate operation of the climate system in advance of a departure time defined by a user such that the climate system operates for a duration defined by the user before the departure time, provided that grid power from a plug is not available to power the operation, and
      initiate operation of the climate system at a start time selected by the controller such that a temperature within a cabin achieves a target temperature defined by the user in advance of the departure time and the climate system does not operate for a duration defined by the user before the departure time, provided that the grid power is available to power the operation.

2. The vehicle of claim 1, wherein the controller is further programmed to select the start time based on ambient temperature and the target temperature.

3. The vehicle of claim 1, wherein the controller is further programmed to, provided that the grid power is available to power the operation, exclusively power the operation with the grid power.

4. The vehicle of claim 1 further comprising a battery, wherein the controller is further programmed to power the operation with power from the battery provided that the grid power is not available to power the operation.

5. The vehicle of claim 1 further comprising an engine, wherein the controller is further programmed to start the engine to power the operation provided that the grid power is not available to power the operation.

6. The vehicle of claim 1, wherein the climate system is configured to condition the cabin.

7. A method for controlling a climate system of a vehicle, comprising:
   responsive to power remote from the vehicle being available for use with the climate system, activating the climate system at a start time such that a temperature within a cabin achieves a target temperature in advance of a departure time and the climate system does not operate for a duration defined by a user before the departure time; and
   responsive to power remote from the vehicle not being available for use with the climate system, activating the climate system in advance of the departure time such that the climate system operates for the duration defined by the user before the departure time.

8. The method of claim 7 further comprising selecting the start time based on ambient temperature and the target temperature.

9. The method of claim 7 further comprising exclusively using the power remote from the vehicle with the climate system responsive to the power remote from the vehicle being available for use with the climate system.

10. The method of claim 7 further comprising using battery power with the climate system responsive to the power remote from the vehicle not being available for use with the climate system.

11. The method of claim 7 further comprising starting an engine responsive to the power remote from the vehicle not being available for use with the climate system.

12. A climate control system comprising:
a controller programmed to activate a climate system at a start time selected by the controller such that a temperature within a cabin achieves a target temperature in advance of a departure time responsive to a request for preconditioning and grid power being available to power the climate system, and to activate the climate system at a start time selected by the controller such that the climate system operates for a duration defined by a user responsive to the request for preconditioning and the grid power not being available to power the climate system.

13. The climate control system of claim 12, wherein the controller is further programmed to select the start time based on ambient temperature and the target temperature.

14. The climate control system of claim 12, wherein the controller is further programmed to exclusively use the grid power with the climate system responsive to the request and the grid power being available to power the climate system.

15. The climate control system of claim 12, wherein the controller is further programmed to use battery power with the climate system responsive to the request and the grid power not being available to power the climate system.

16. The climate control system of claim 12, wherein the controller is further programmed to start an engine responsive to the request and the grid power not being available to power the climate system.

17. The vehicle of claim 12, wherein the climate system is configured to condition the cabin.

* * * * *